(12) United States Patent
Mullaney et al.

(10) Patent No.: US 7,330,627 B2
(45) Date of Patent: Feb. 12, 2008

(54) COILED CABLE PRODUCTS AND METHODS OF FORMING THE SAME

(75) Inventors: Julian Mullaney, Raleigh, NC (US); Robert A. Roach, Garner, NC (US); Robert Nguyen, Clayton, NC (US); Roy Keller Thompson, Apex, NC (US); Eric Alston, Fuquay Varina, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/433,109

(22) Filed: May 12, 2006

(65) Prior Publication Data
US 2006/0183362 A1 Aug. 17, 2006

Related U.S. Application Data

(60) Provisional application No. 60/790,407, filed on Apr. 7, 2006.

(51) Int. Cl.
*G02B 6/00* (2006.01)
(52) U.S. Cl. ...................... 385/135; 385/134
(58) Field of Classification Search ................ 385/135, 385/134; 242/405.2
See application file for complete search history.

(56) References Cited

U.S. PATENT DOCUMENTS 4,586,675 A * 5/1986 Brown ..................... 242/405.2

FOREIGN PATENT DOCUMENTS

JP 04-355410 * 9/1992

* cited by examiner

*Primary Examiner*—Brian Healy
*Assistant Examiner*—Charlie Peng
(74) *Attorney, Agent, or Firm*—Myers Bigel Sibley & Sajovec (57) ABSTRACT

Cable arrangements include a length of springy cable looped in a figure 8 arrangement with an intermediate cross-over section between respective first and second looped sections of the cable. The figure 8 arrangement enables withdrawal of the cable from the arrangement with no more than a single twist of the cable to limit accumulated net linear twist of the cable while linearly extending the cable. The first and second looped sections may be positioned overlapping each other to provide a substantially toroidal shaped cable arrangement. An optical device may be provided on one or both of the ends of the length of cable. The springy cable may be a fiber optic cable, such as flat drop cable. Cable products, enclosures and methods of forming a cable arrangement are also provided.

46 Claims, 9 Drawing Sheets

COILED CABLE PRODUCTS AND METHODS OF FORMING THE SAME

RELATED APPLICATIONS

The present application claims priority from U.S. Provisional Application No. 60/790,407, filed Apr. 7, 2006, the disclosure of which is hereby incorporated herein in its entirety by reference.

BACKGROUND OF THE INVENTION

The present invention relates to cable products and, more particularly, to coiled cable products and methods for forming the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems.

As such, fiber optic cables are widely used for telecommunications applications where high information capacity, noise immunity and other advantages of optical fibers may be exploited. Fiber cable architectures are emerging for connecting homes and/or business establishments, via optical fibers, to a central location, for example. A trunk or main cable may be routed, for example, through a housing subdivision and small fiber count "drop cables" may be spliced to the main cable at predetermined spaced apart locations.

Typical flat drop style fiber optic cable is stiff, springy, and has an oval cross section (not round). In particular, it generally resists twisting around its axis. This may make such cables very difficult to handle. Unlike some round cross section cables, if flat cable is forced into a twist about it's axis, it tends to bow up into a helical spring shape, and can tangle easily. As used herein, a "springy" or "resilient" cable refers to a cable, such as a flat drop style fiber optic cable, that has an inherent tendency to expand outwards when coiled while a "stiff" cable refers to a cable that is resistant to bending like a springy or resilient cable but does not have an inherent tendency to expand outwards. Thus, for example, a typical maritime rope is neither springy nor stiff.

This twisting can be a problem when a springy cable is being unwound from a conventional reel. Particular care may be needed to control the drag on the reel so that the outer loops do not spring out to a larger diameter than the outside of the reel and fall off the reel and/or become tangled with one another. This is typically done with complex de-reeling machines with drag brakes or by having a person dedicated to manually tending the reel as it is unwound.

Optical fibers in an optical fiber cable are also sensitive to twist that can be imparted when removing the cable from a spool or the like. In particular, accumulated twist generally is not good for cables, and fiber cable particularly. When unwinding from a conventional reel, the reel generally must be able to rotate like a wheel. Otherwise, accumulated twist may be imparted to fiber as the cable is unwound by pulling it along the central axis of the reel off an end of the cable reel. Thus, additional equipment may be needed during field installation of cable to allow the cable reels to rotate during drawing of the cable.

SUMMARY OF THE INVENTION

Embodiments of the present invention include cable arrangements including a length of springy cable looped in a FIG. 8 arrangement with an intermediate cross-over section between respective first and second looped sections of the cable. The FIG. 8 arrangement enables withdrawal of the cable from the arrangement with no more than a single twist of the cable to limit accumulated net linear twist of the cable while linearly extending the cable. The first and second looped sections may be positioned overlapping each other to provide a substantially toroidal shaped cable arrangement. An optical device may be provided on one or both of the ends of the length of cable. The springy cable may be a fiber optic cable, such as flat drop cable.

In some embodiments, a plurality of retainer members are positioned around the cable at selected locations on the cable arrangement that retain the cable looped in the FIG. 8 arrangement. The plurality of retainer members may include a retainer member on each of the looped sections and a retainer member on the cross-over section. The retainer members may be tie-wraps.

In other embodiments, the end arranged to be drawn a first end of the cable and the cable has an opposite second end. The looped sections may be selectively arranged to overlap each other rotated about the cross-over section in a first direction to facilitate tangle free drawing of the first end of the cable from the arrangement and rotated about the cross-over section in a substantially opposite second direction to facilitate tangle free drawing of the second end of the cable from the arrangement.

In further embodiments, cable products are provided including a cable enclosure defining a cable receiving cavity and having a cable receiving opening extending to the cable receiving cavity. A length of springy cable is positioned in the cable receiving cavity and looped in a FIG. 8 arrangement with an intermediate cross-over section between respective first and second looped sections of the cable. The FIG. 8 arrangement enables withdrawal of an end of the cable from the arrangement through the cable receiving opening to linearly extend the length of cable with no more than a single twist of the cable to limit accumulated net linear twist of the cable while linearly extending the cable. The first and second looped sections may be positioned overlapping each other and extending from the cross-over section at an acute angle relative to each other to define a V-shaped region and an end of the cable may extend through the cable receiving opening from the V-shaped region. The acute angle may be selected based on a stiffness of the cable and may be about 10 degrees.

In other embodiments, interior dividing walls are positioned in the cable receiving cavity that separate the first and second looped sections to limit entanglement of the cable when the end is drawn from the cable arrangement. The interior dividing walls may be V-shaped. The cable enclosure and/or the interior dividing walls may be cardboard and may be re-usable or disposable. Removable retainers may be provided coupling the looped sections of the cable to the enclosure that maintain the v-shaped region substantially free of cable when the cable product is moved. The removable retainers may be removed to allow the end of the cable to be drawn from the cable arrangement.

In yet other embodiments, the end extending through the opening is a first end of the cable and the cable has an opposite second end. The looped sections are positioned in the cable receiving cavity overlapping each other rotated about the cross-over section in a first direction to facilitate tangle free drawing of the first end of the cable from the arrangement. The length of cable may be removably positioned in the cable receiving cavity to allow the looped sections to be rotated about the cross-over section in a substantially opposite second direction and re-inserted in the cable receiving section with the second end extending through the cable receiving opening to facilitate tangle free drawing of the second end of the cable from the arrangement. A retainer may be provided coupling the end of the cable not extending through the opening to the cable enclosure. The overlapping looped sections may define a toroidal or cylindrical arrangement having an outer diameter of no more than about thirty-four inches and wherein the enclosure has a length and a width no less than the outer diameter of the toroidal arrangement. The outer diameter of the toroidal arrangement may be about thirty-two inches and the length and width of the enclosure may be about thirty-four inches. The enclosure may have a depth of about twelve inches and the length of cable may be about one thousand feet. In some embodiments, the length of cable may be from about fifty feet to about 2000 feet.

In further embodiments, the first and second looped sections are positioned in the cavity in a non-overlapping relationship with each other and the cable receiving opening is positioned proximate the cross-over section.

In yet other embodiments, fiber optic cable products include a cable enclosure defining a cable receiving cavity and having a cable receiving opening extending to the cable receiving cavity. A length of springy fiber optic cable is positioned in the receiving cavity and looped in a FIG. 8 arrangement with an intermediate cross-over section between respective first and second looped sections of the cable. The first and second looped sections are positioned overlapping each other and extending from the cross-over section at an acute angle relative to each other to define a V shaped region. An end of the cable extends through the cable receiving opening from the V shaped region. The FIG. 8 arrangement enables withdrawal of the end of the cable from the arrangement through the cable receiving opening to linearly extend the length of cable with no more than a single twist of the cable to limit accumulated net linear twist of the cable while linearly extending the cable.

Interior dividing walls are positioned in the cable receiving cavity that separate the first and second looped sections to limit entanglement of the cable when the end is drawn from the cable arrangement. The cable enclosure has a depth selected to provide the acute angle to the overlapping looped sections when the length of cable is positioned in the cable receiving cavity.

In further embodiments, cable enclosures include a housing defining a cable receiving cavity configured to receive a length of springy cable in the cable receiving cavity and looped in a FIG. 8 arrangement with an intermediate cross-over section between respective first and second looped sections of the cable. A cable receiving opening extends to the cable receiving cavity. The cable receiving opening is configured to receive an end of the cable extending through the cable receiving opening that is arranged to be drawn from the cable arrangement to linearly extend the length of cable without causing an accumulated net linear twist of the cable. The housing may be to receive the first and second looped sections positioned overlapping each other and extending from the cross-over section at an acute angle relative to each other to define a V shaped region and the cable receiving opening may be proximate the V shaped region at an end opposite the cross-over section. The housing may be configured to receive the first and second looped sections positioned in the cavity in a non-overlapping relationship with each other and the cable receiving opening may be positioned proximate the cross-over section.

In some embodiments, methods of coiling a length of springy cable include laying the length of cable in a FIG. 8 pattern including an intermediate cross-over region between respective first and second looped sections of the cable and securing the length of cable in the FIG. 8 pattern. Laying the length of cable may be preceded by providing a cable receiving frame sized to provide a desired length and width to the FIG. 8 pattern and laying the length of cable in the cable receiving frame. Securing the length of cable may include placing the length of cable in a cable receiving cavity of a cable enclosure.

In further embodiments, the cable enclosure includes a cable receiving opening extending to the cable receiving cavity and placing the length of cable is preceded by folding the first looped section into a position overlapping the second looped section with the first and second looped sections extending from the cross-over section at an acute angle relative to each other to define a V-shaped region. Placing the length of cable includes placing the folded length of cable in the cable receiving cavity with the cable receiving opening proximate the V-shaped region and inserting an end of the length of cable extending from the V-shaped region through the cable receiving opening of the cable enclosure. The method may further include selecting the acute angle based on a stiffness of the cable and sizing the cable enclosure to provide the selected acute angle to the V-shaped region when the length of cable is placed in the cable receiving cavity.

In other embodiments, the end extending through the cable receiving opening is a first end of the cable and the cable has an opposite second end. Placing the folded length of cable includes positioning the looped sections in the cable receiving cavity overlapping each other rotated about the cross-over section in a first direction to facilitate tangle free drawing of the first end of the cable from the arrangement. The length of cable may be removed from the cable receiving cavity. The looped sections may be rotated about the cross-over section in a substantially opposite second direction and the rotated looped sections may be placed in the cable receiving cavity with the second end extending through the cable receiving opening to facilitate tangle free drawing of the second end of the cable from the arrangement.

In further embodiments, the second end of the cable is coupled to the enclosure using a retainer and removing the length of cable from the cable receiving cavity includes separating the second end from the enclosure. Placing the rotated looped sections in the cable receiving cavity includes coupling the first end of the cable to the enclosure using a retainer. The cable enclosure may include interior dividing walls positioned in the cable receiving cavity and placing the folded length of cable in the cable receiving cavity may include placing the length of cable in the cable receiving cavity with the interior dividing walls separating the first and second looped sections to limit entanglement of the cable when the end is drawn through the cable receiving opening. Placing the folded length of cable in the cable receiving cavity may further include coupling the looped sections of the cable to the enclosure using removable retainers to maintain the V-shaped region substantially free of cable.

In use, the removable retainers may be removed and the first end of the cable may be drawn from the FIG. 8 pattern to linearly extend the length of cable without causing more than a single twist of the cable to limit accumulated net linear twist of the cable while linearly extending the cable.

Afterwards, the cable enclosure may be disposed of or another length of cable may be placed in the cable receiving cavity, the another length of cable having a first end extending through the cable receiving opening and a second end in the cable receiving cavity.

In further embodiments, methods of coiling a length of springy fiber optic cable include laying the length of cable having a first end and a second end in a FIG. 8 pattern including an intermediate cross-over region between respective first and second looped sections of the cable. The first looped section is folded in a selected direction about the cross-over section into a position overlapping the second looped section with the first and second looped sections extending from the cross-over section at an acute angle relative to each other to define a V-shaped region. The folded length of cable is placed in a cable receiving cavity of a cable enclosure with the cable receiving opening proximate the V-shaped region and with the looped sections positioned in the cable receiving cavity rotated about the cross-over section in the selected direction. The first end of the length of cable extending from the V-shaped region is inserted through the cable receiving opening of the cable enclosure. The selected direction is selected to facilitate tangle free drawing of the first end of the cable from the cable enclosure.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Cable products and methods of forming the same according to some embodiments of the present invention will now be further described with reference to FIGS. 1-11. As will be described, some embodiments of the present invention may address problems of tangling and/or accumulated net linear twist for springy cable by winding the cable not on a conventional reel but in a successive "FIG. 8" patterns that are laid upon each other. The layered FIG. 8 coils may be laid over each other until the assembly resembles a normal circular coil. The coil so assembled may be loaded in a dispensing fixture or enclosure, as described herein, from which it can be uncoiled with reduced or even no tangling, and without an attendant, and without a de-reeling machine. In some embodiments, the dispensing fixture is also the shipping container for the product and may be disposable.

Figure 8:
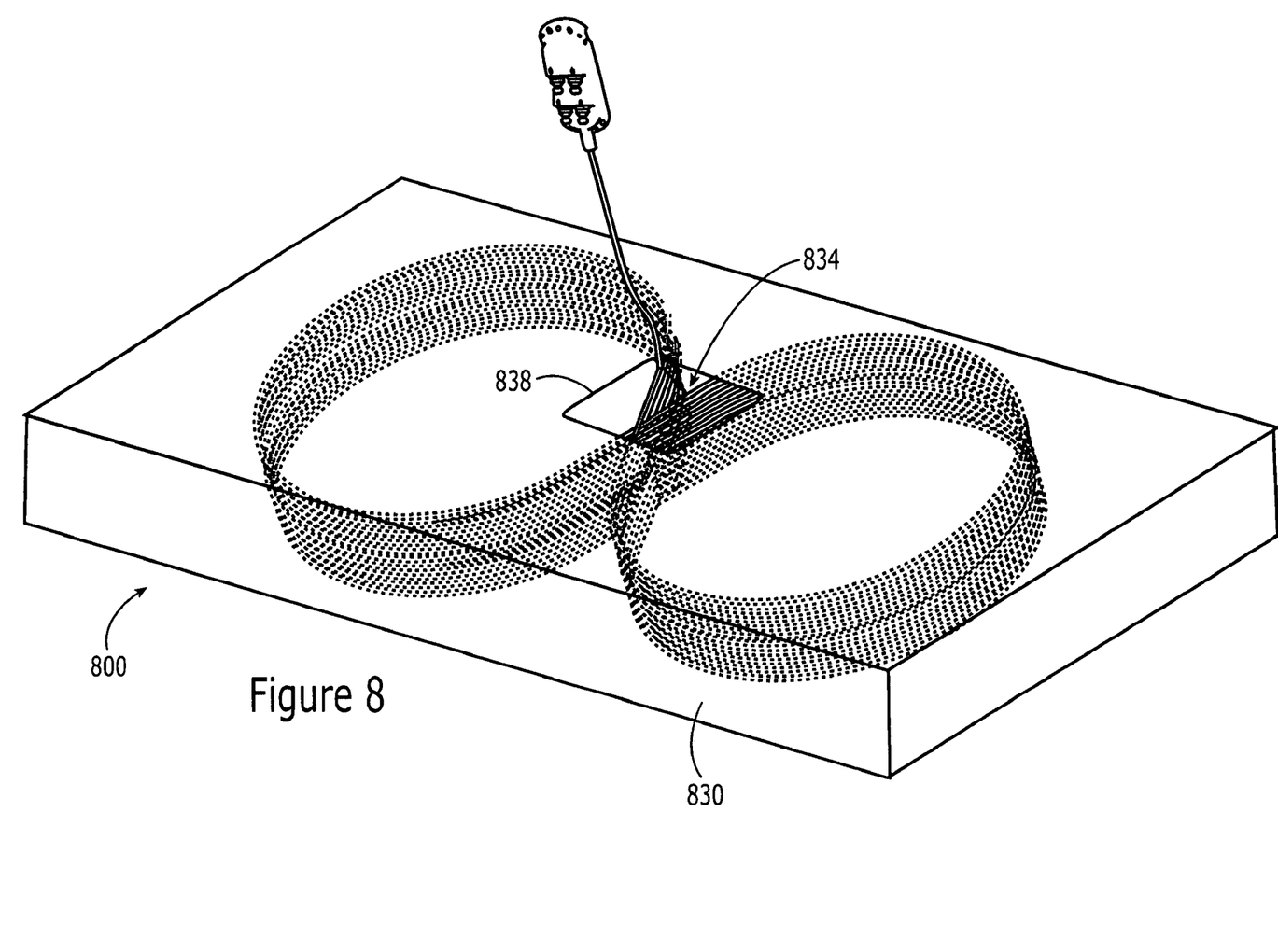
FIG. 8 is a perspective view of a cable product including the optical fiber cable of FIG. 1 in a cable enclosure according to some embodiments of the present invention.

One consideration in this approach is that, by laying the coils in FIG. 8 patterns one above the other, the cable undergoes a twist about its axis each time. However, the twist in one turn is clockwise followed by one turn anti-clockwise, in the next turn. This pattern is repeated over and over as the FIG. 8 coils are laid down over each other. Thus, when the cable is eventually pulled from the coiled shape (in its end use in the field) it may not accumulated a net twist. In other words, drawing an end of the cable from the FIG. 8 arrangement (pattern) to linearly extend the length of cable may be accomplished without causing more than a single twist of the cable to limit accumulated net linear twist of the cable while linearly extending the cable. An accumulated net linear twist of the cable as used herein refers to an amount of twist greater than a single twist.

Some embodiments of the present invention provide assembled coils in a packaging container that can be jostled about during shipping and can actually become overlapped, yet the design of the folded coils and the dispensing fixture (in this case also the shipping box) may allow the cable to be withdrawn at high speed with little or even no entanglement.

Figure 1:
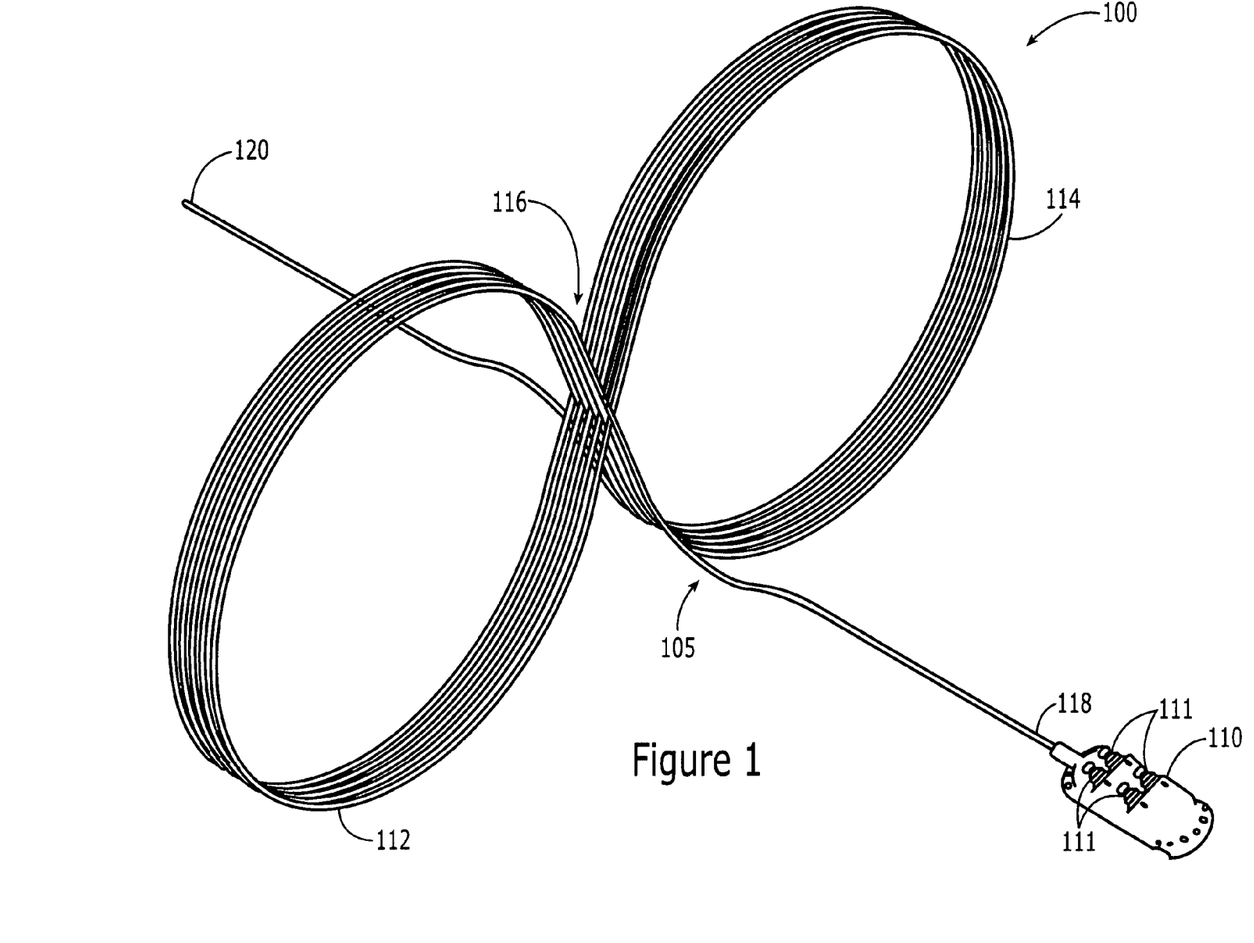
FIG. 1 is a perspective view illustrating an optical fiber cable in a FIG. 8 arrangement with an optical device on an end thereof according to some embodiments of the present invention.

A coil product 100 according to some embodiments of the present invention will now be further described with reference to the perspective view illustration of FIG. 1. As seen in the embodiments of FIG. 1, the coil product 100 includes a length of a springy cable 105 having a first end 118 and a second end 120. In addition, an optical device 110 is shown on the first end 118 of the cable 105. The illustrated optical device 110 includes a plurality of optical connectors 111, that may be connectors such as the Optitap™ connector available from Corning, Inc. of Corning, N.Y.

In some illustrated embodiments, the cable product 100 has the length of the springy cable 105 arranged in a FIG. 8 arrangement with an intermediate cross-over section 116 between respective first 112 and second 114 looped sections of the cable 105. As will be further discussed herein, an end 118 or 120 of the cable 105 is arranged to be drawn from the cable product 100 to linearly extend the length of cable 105 without causing an accumulated net linear twist of the cable 105.

In some embodiments, the springy cable 105 may be a fiber optic cable. The fiber optic cable may be a flat drop cable, such as that available from Corning Incorporated. For example, the flat drop cable 105 may be of the type with two strength members, one on each side of the flat cable. In some embodiments, a length of about 1000 feet of the cable 105 is wrapped into a FIG. 8, with each half 112, 114 having an outer diameter of about 32". The FIG. 8 of cable 105 may be folded and placed in a dispenser/packing, as will be described further herein, and, for a 32" diameter cable in some embodiments, the dispenser/packaging may be about 34" by about 34" by about 12".

Figure 2:
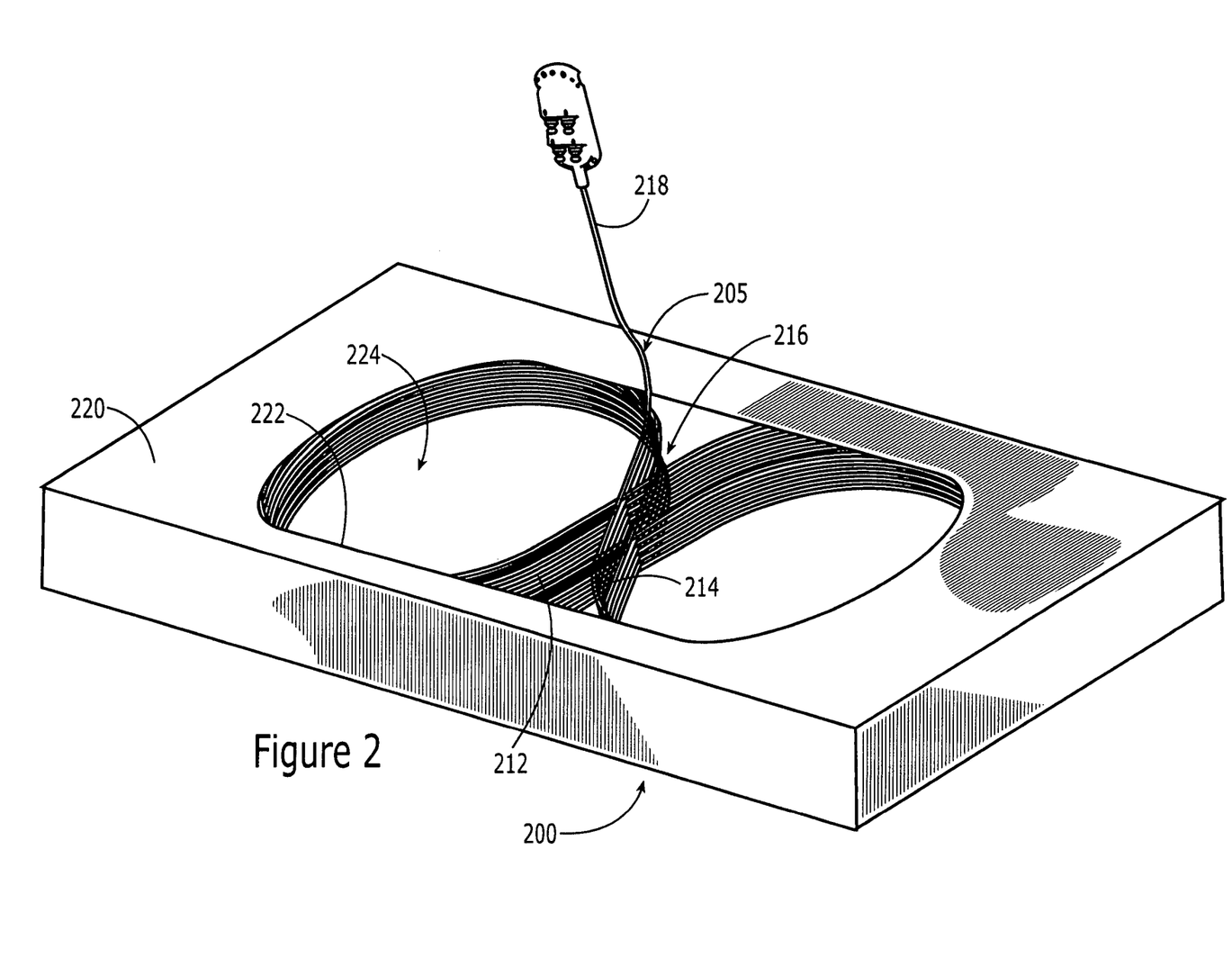
FIG. 2 is a perspective view of an optical fiber cable in a FIG. 8 arrangement in a cable receiving frame according to some embodiments of the present invention.

Referring now to FIG. 2, the FIG. 8 pattern illustrated in the embodiments of FIG. 1 may be provided by laying the cable 105 in the FIG. 8 pattern in a frame, such as the box 220, that may be sized to provide a desired length and width to the FIG. 8 pattern. The length of cable 105 may be laid in the cable receiving frame box 220, for example, by a machine that feeds the cable at a specified rate through a moving arm that forms the FIG. 8 pattern. The size and shape of the box may further be optimized or selected based on the stiffness of the cable 105 being coiled. The layers of coils may be secured by retainer members, such as tie-wraps, to preserve their general shape during further assembly of the coil product as will be further described herein.

As more fully shown in the embodiments of FIG. 2, a cable coiling assembly 200 includes the box 220 defining an interior cavity 224 sized to receive the FIG. 8 arranged cable 205. The cable is fed into the cavity 224 through an opening 222 in the box 220 and laid out in a pattern in the box 220. The arranged coil 205 includes a first 212 and second 214 looped section with an intermediate cross-over section 216 therebetween.

Figure 3:
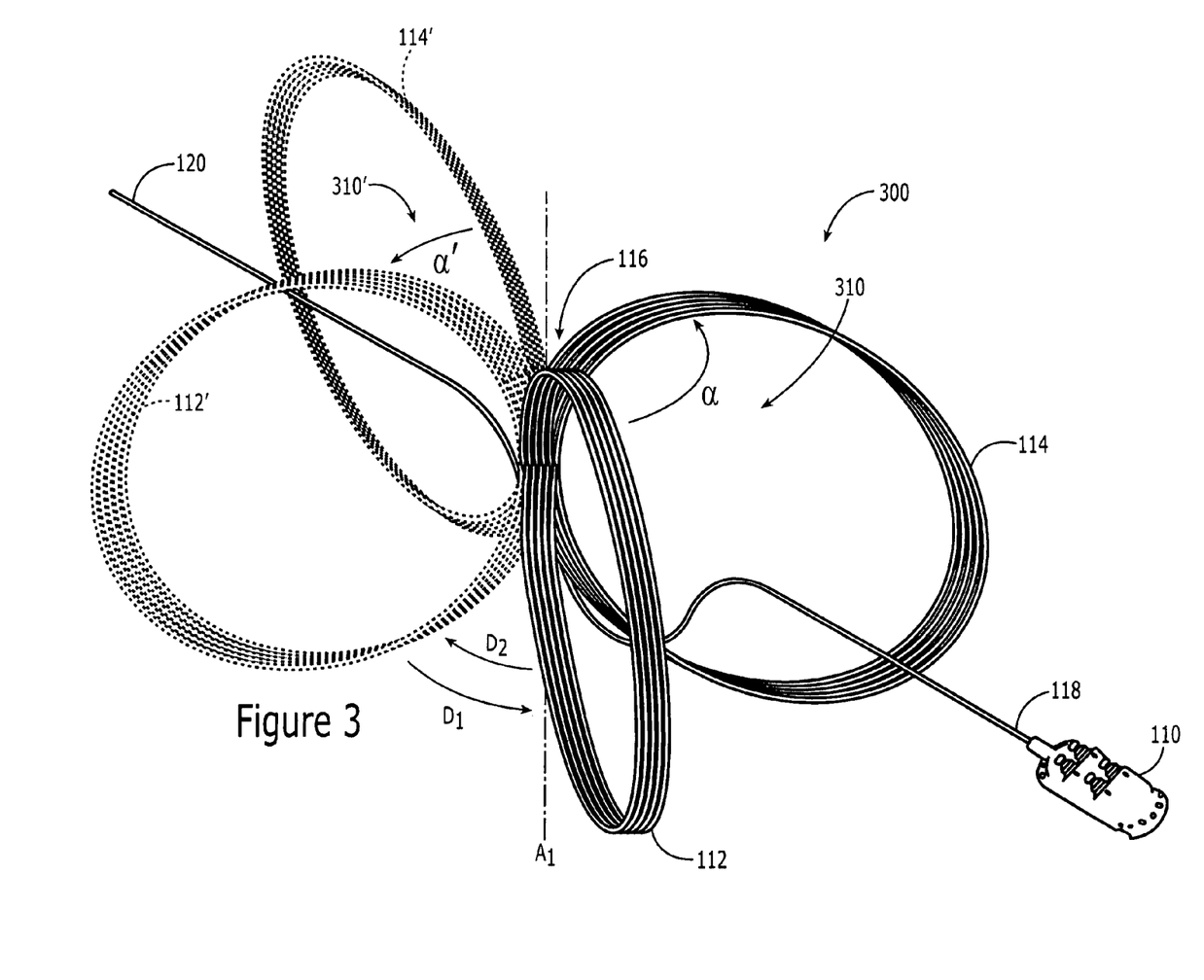
FIG. 3 is a perspective view of the optical fiber cable of FIG. 1 with overlapping loops and the optical device extending from a V-shaped region defined by the overlapping loops according to some embodiments of the present invention.
Figure 4:
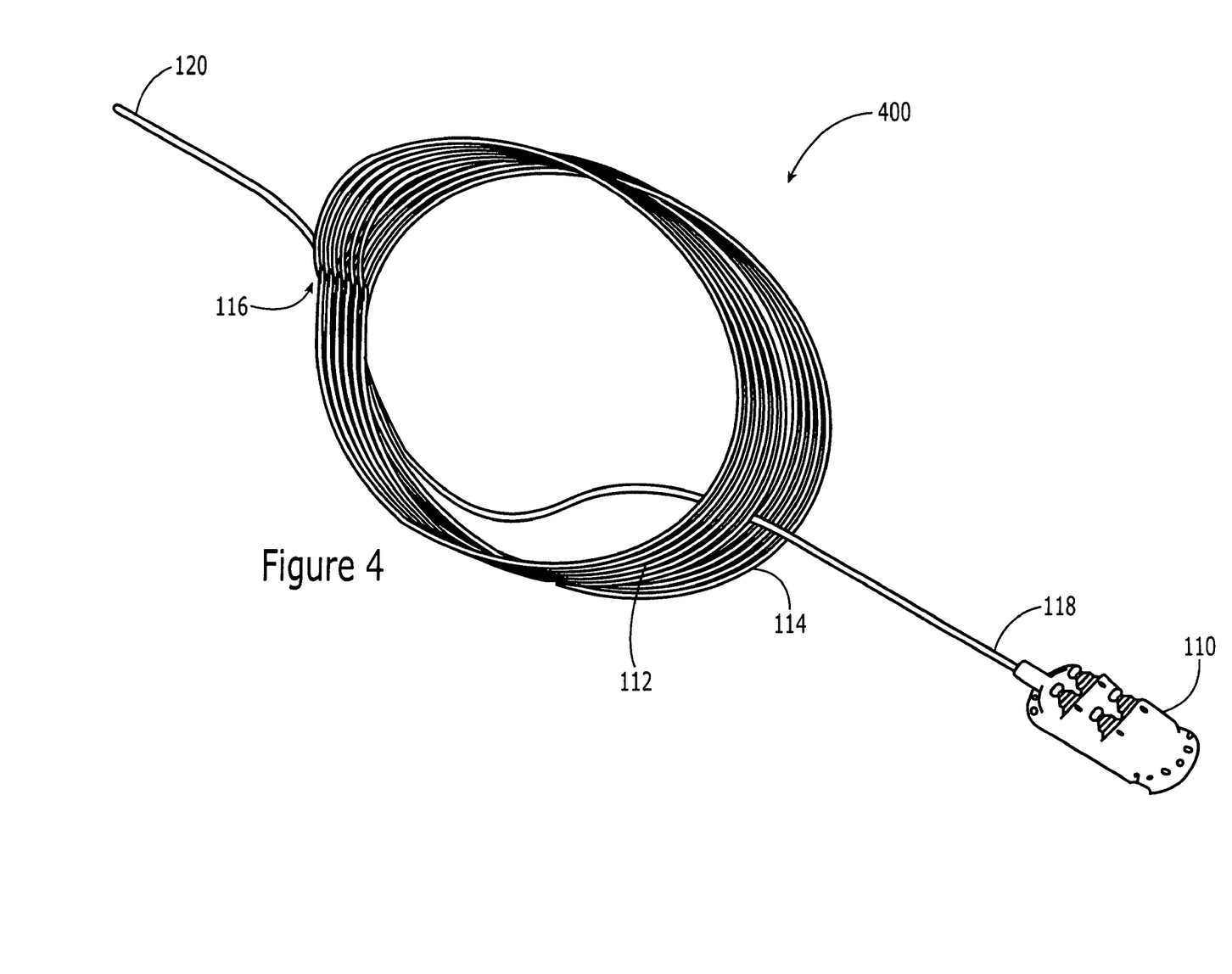
FIG. 4 is a perspective view of the optical fiber cable of FIG. 3 in a fully folded over position.

Further embodiments of the present invention will now be described with reference to the perspective view illustration of FIG. 3. As shown in the embodiments of FIG. 3, the cable product 300 includes a FIG. 8 pattern of coil as described previously with reference to FIG. 1, that is folded in half upon itself, such that the resulting shape may roughly resemble an ordinary circular coil as shown in the cable product 400 of FIG. 4. Note that FIG. 4 illustrates the cable product of FIG. 3 as it would appear if the respective looped sections 112, 114 were fully folded over on each other to further illustrate the similarity of the folded shape to a conventional spooled coil.

It will be understood that, in some embodiments to preserve the FIG. 8 arrangement during folding of the respective looped sections 112, 114, a plurality of retainer members, such as tie-wraps, may be positioned around the cable 105, 205 at selected locations on the cable 105, 205 to retain the cable looped in the FIG. 8 arrangement. The selected locations may include one retainer member on each of the looped sections 112, 114 as well as a retainer member on the cross-over section 116.

Referring again to FIG. 3, the looped sections 112, 114 may be selectively arranged to overlap each other rotated about the axis A1 of the cross-over section 116. More particularly, the looped sections 112, 114 may be rotated in a first direction D1 to facilitate tangle free drawing of the first end 118 of the cable 105 from the arrangement as shown in solid lines in FIG. 3 and in substantially opposite second direction D2, shown in dotted line of FIG. 3, to facilitate tangle free drawing of the second end 120 of the cable from the arrangement. It will further be understood, that while the optical device 110 is shown on the first end 118 in FIG. 3, it may likewise be located on the second end 120 or an optical device 110 or other optical connection point may be provided on both ends of the cable 105.

As more particularly seen in FIG. 3, the first 112 and second 114 looped sections are positioned overlapping each other and extending from the cross-over section 116 at an acute angle α relative to each other to a V-shaped region 310. The first end 118 of the cable 105 extends from the V-shaped region 310. Similarly, the opposite rotational direction is shown in dotted line in FIG. 3, where the second end 120 extends from a V-shaped region 310' provided by positioning the respective loop sections at an acute angle α'. Note that the acute angle α, α' in some embodiments is selected based on a stiffness of the cable. In particular embodiments, the acute angle α, α' is about 10 degrees.

One consideration in selecting the acute angle α, α' is the degree to which the looped sections are folded over to resemble a regular coil may affect the risk of entanglement of the cable 105 during unwinding. To reduce or even avoid entanglement, some embodiments of the present invention do not fully fold over the looped sections as illustrated in FIG. 3. Furthermore, it will be understood that, in other embodiments of the present invention, the looped sections are completely open (unfolded). In any event, FIG. 3 illustrates use of folded coils according to some embodiments of the present invention and how the coils (looped sections) can unwind without tangling when a respective end is withdrawn from the V-shaped section 310, 310'.

Figure 5:
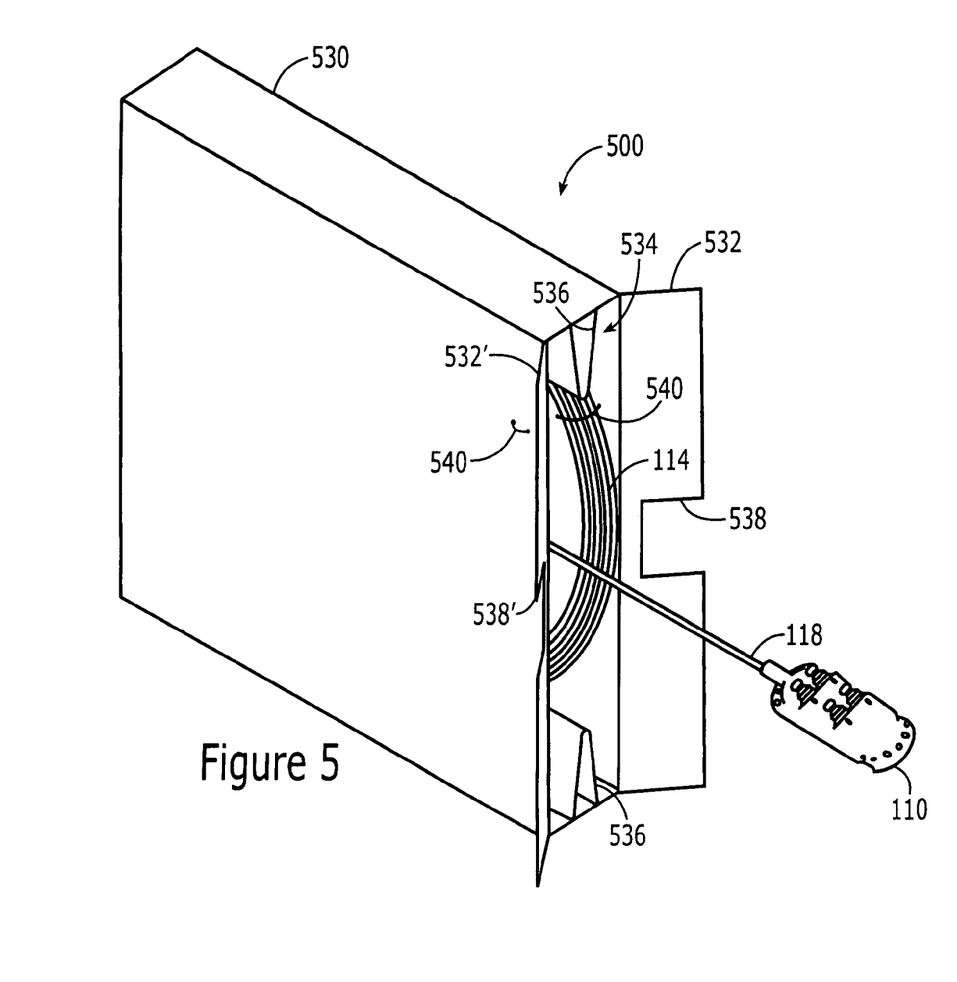
FIG. 5 is a perspective view of a cable product including the optical fiber cable of FIG. 3 in a cable enclosure according to some embodiments of the present invention.
Figure 6:
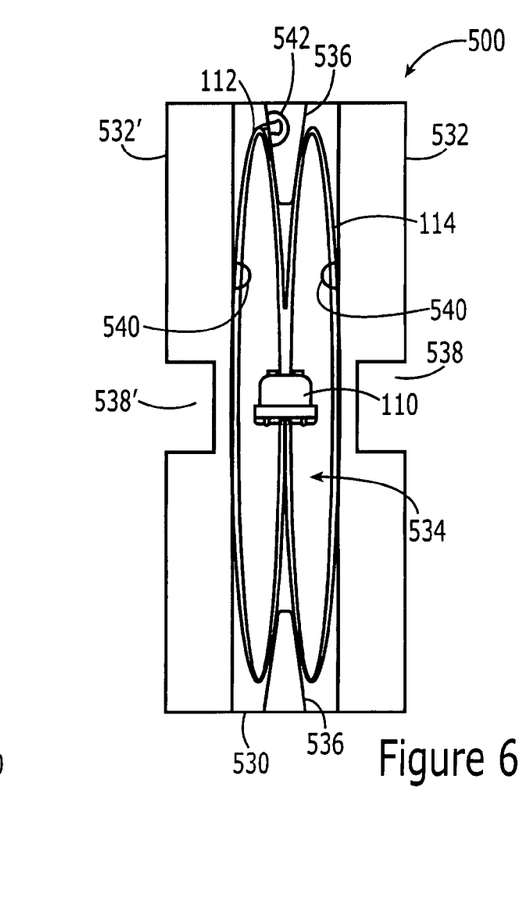
FIG. 6 is an end view of the cable product of FIG. 5.

Further embodiments of a cable product 500 will now be described with reference to FIGS. 5 and 6. FIG. 5 is a perspective view of the cable product 500 while FIG. 6 is an end view through an open end of the cable product 500. As seen in FIGS. 5 and 6, the cable product 500 includes a cable enclosure 530 defining a cable receiving cavity 534 and having a cable receiving opening sections 538, 538' extending to the cable receiving cavity 534 from outside the cable enclosure 530. The length of springy cable 105 is positioned in the cable receiving cavity 534 and looped in a FIG. 8 arrangement with an intermediate cross-over section 116 between respective first 112 and second 114 looped sections of the cable 105.

Figure 7:
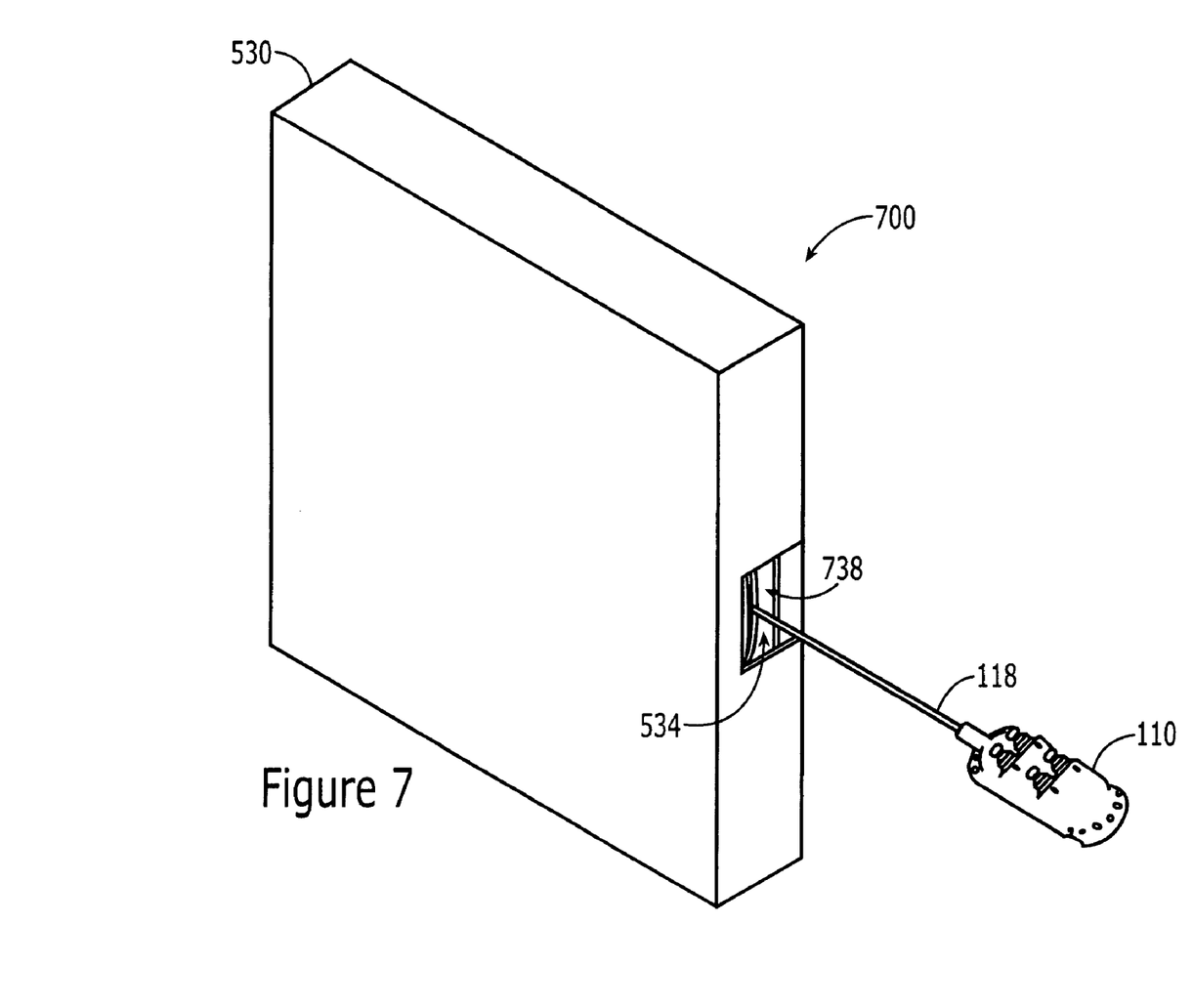
FIG. 7 is a perspective view of the cable product of FIG. 5 with the enclosure end opening closed.

As illustrated in FIGS. 5 and 6, one end of the cable enclosure 530 is shown as having two flaps 532, 532', shown in an open position allowing insertion of the cable 105 in an overlapping FIG. 8 arrangement into the cable receiving cavity 534. As seen in FIG. 7, when the flaps 532, 532' are closed and in an overlapping position, the respective opening sections 538, 538' may overlap to define the cable receiving opening 738. An end 118 of the cable 105 extends through the cable receiving opening 738 that is arranged to be drawn from the FIG. 8 cable arrangement to linearly extend the length of cable 105 without causing an accumulated net linear twist of the cable. This is further seen in FIGS. 5-7, where the end of the cable to be extended linearly extends through the cable receiving opening 738 from the V-shaped section 310, 310' between the respective looped sections 112, 114 as described with reference to FIG. 3 above.

As further illustrated in the embodiments of FIGS. 5 and 6, the cable product 500 includes interior dividing walls 536 positioned in the cable receiving cavity 534 that separate the first 112 and second 114 looped sections. The interior dividing walls 536 may be provided, in some embodiments, to limit entanglement of the cable 105 when the end 118 is drawn from the enclosure 530. As shown in the embodiments of FIGS. 5 and 6, the interior dividing walls 536 are V-shaped.

Also shown in the embodiments of FIGS. 5 and 6 are removable retainers 540 coupling the looped sections 112, 114 of the cable 105 to the enclosure 530 to maintain the V-shaped region 310, 310' (FIG. 3) substantially free of cable when the cable product 500 is moved in shipping or the like. The removable retainers 540 may be removed to allow the end 118 of the cable 105 to be drawn from the enclosure 530.

The embodiments illustrated in FIGS. 5 and 6, further include a retainer 542 coupling the second end 120 of the cable 105 to the enclosure 530. As particularly shown in FIG. 6, the second end 120 is positioned in the interior of the V-shaped dividing wall 536 with the retainer 542 coupling the end 120 to the V-shaped interior dividing wall 536. However, it will be understood that other arrangements may be used in various embodiments of the present invention, including allowing the second end 120 to remain loose in the cavity 534. In addition, it will be understood that, where the cable 105 is removed from the cavity 534 rotated and reinserted to allow drawing of cable by the second end 120, the first end 118 may be coupled to the enclosure 530 at the interior dividing wall 536 or otherwise.

As described above, in some embodiments, the folded cable may be placed in a dispensing fixture or tool that may be designed to receive a particular cable configuration. In some embodiments, this dispensing fixture can also be the packaging container in which the product is shipped. The fixture may include cardboard inserts or other interior dividing walls that may be of a predetermined shape and/or size to reduce or even prevent entanglement of the cable as it is withdrawn from the center of the coiled assembly and may be sized for a particular cable arrangement. The configuration of the dispensing fixture, its internal dividing walls, the diameter of the coils, and the shape of the FIG. 8 forming box may be optimized in concert for each different type of cable, in particular for cables of different stiffness.

For some embodiments of the present invention as described above, the FIG. 8 shaped fiber optic cable can be folded over to roughly resemble a normal circular coil. If folded one way, then the end of the cable that is located in the "V" fold may be withdrawn without tangling in some embodiments. If it is desired to pull the other end of the cable, then the roughly circular coil may be laid back out into its original flat FIG. 8 pattern and then folded the other way to resemble a similar, but opposite, roughly circular coil again. In some such embodiments, the other end of the cable will now be located in the center of the "V" formed by partially but not completely folding over the FIG. 8 into a roughly circular coil, and may be withdrawn without tangling. This may be useful in field applications where the cable may have devices attached to one or either end, and it is desired to uncoil from one end in some situations, and the other end in different situations.

FIG. 7 illustrates embodiments of the present invention embodied as a dispensing fixture/packaging with the top (end) flaps closed ready for shipment. Note the end of the cable protruding has an optical device 110 in the illustrations. This is the end that is withdrawn when the cable is dispensed, for example, for its final application in the field. However, in other embodiments, either or both ends can have a connector or neither end may include a connector.

Referring now to the respective view illustration of FIG. 8, in further embodiments of the present invention in which a cable product 800 is provided where the looped sections are not folded over will be described. As shown in the embodiments of FIG. 8, the cable product includes a cable enclosure or box 830 sized to receive a length of cable 105 without the respective looped sections being folded over. The cable enclosure 830 defines an interior cavity 834 configured to receive the length of cable 105 positioned in the cavity 834 in a non-overlapping relationship with each other. The cable product 800 further includes a cable receiving opening 838 in the cable enclosure 830 that is shown positioned proximate the cross-over section 116 of the length of cable 105. The cable enclosure in the various embodiments described with reference to FIGS. 1-8, may be, for example, made of cardboard and may be a disposable or reusable cable enclosure.

Figure 9:
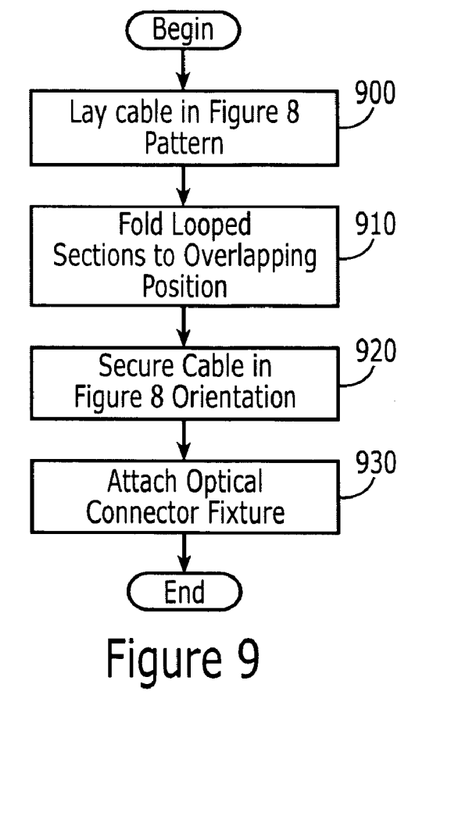
FIG. 9 is a flowchart illustrating operations for coiling a length of springy cable according to some embodiments of the present invention.

Methods of coiling a length of springy cable according to various embodiments of the present invention will now be described with reference to FIGS. 9-11. Referring first to the flowchart illustration of FIG. 9, operations begin by laying the length of cable in a FIG. 8 pattern including an intermediate cross-over region between respective first and second looped sections of the cable (block 900). Operations at block 900 may be preceded by providing a cable receiving frame sized to provide a desired length and width to the FIG.

8 pattern and the length of cable may be laid in the cable receiving frame to form the FIG. 8 pattern.

In some embodiments of the present invention where the FIG. 8 pattern is not placed in a dispensing enclosure in a flat orientation, operations continue by folding the first looped section of the FIG. 8 pattern coil into a position overlapping the second looped section with the first and second looped sections extending from the cross-over section at an acute angle relative to each other to define a V-shaped region (block 910). In a folding over the looped sections at block 910, operations may include selecting the acute angle between the respective looped sections based on a stiffness of the cable and sizing the cable enclosure to provide the selected acute angle to the V-shaped region when the length of cable is placed in the cable receiving cavity. The overlapping looped sections may define a toroidal arrangement having an outer diameter of no more than about 34" in some embodiments and the enclosure may have a length and width no less than the outer diameter of the toroidal arrangement. In some embodiments, the enclosure may have a depth of about 12" and the length of cable may be about 1000 ft.

In both overlapping and non-overlapping arrangements, the cable is secured in a FIG. 8 orientation (block 920). The securing may be provided by a removable retainer members coupled to selected points on the FIG. 8 arrangement of cable and/or by an enclosure holding the coiled length of springy cable. In other words, securing of the cable may be provided by placing the length of cable in a cable receiving cavity of a cable enclosure. In some embodiments, where the cable is to have a fixture or end connector of some type on one or both ends thereof, the method further comprises attaching an optical device or the like on the first and/or second end of the cable (block 930).

Further embodiments of methods of coiling a length of springy cable, in particular, aspects related to placing a folded cable in dispenser packaging, will now be described with reference to the flowchart illustration of FIG. 10. For the embodiments described with reference to both FIG. 10 and FIG. 11, it will be understood that the invention will be described with reference to a folded over arrangement of the cable. However, it will be understood that various aspects of the invention including those described with reference to FIG. 10 and FIG. 11, may further, apply to embodiments in which the FIG. 8 arrangement of cable is not folded over and is arranged in a flat orientation in an enclosure or otherwise.

Figure 10:
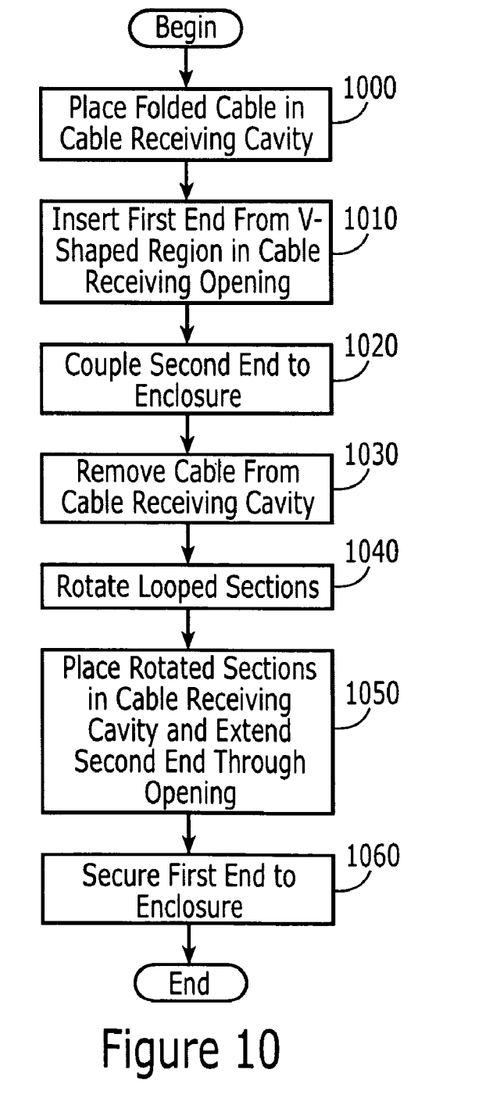
FIG. 10 is a flowchart illustrating operations for placing and removing cable from a cable enclosure according to some embodiments of the present invention.
Figure 11:
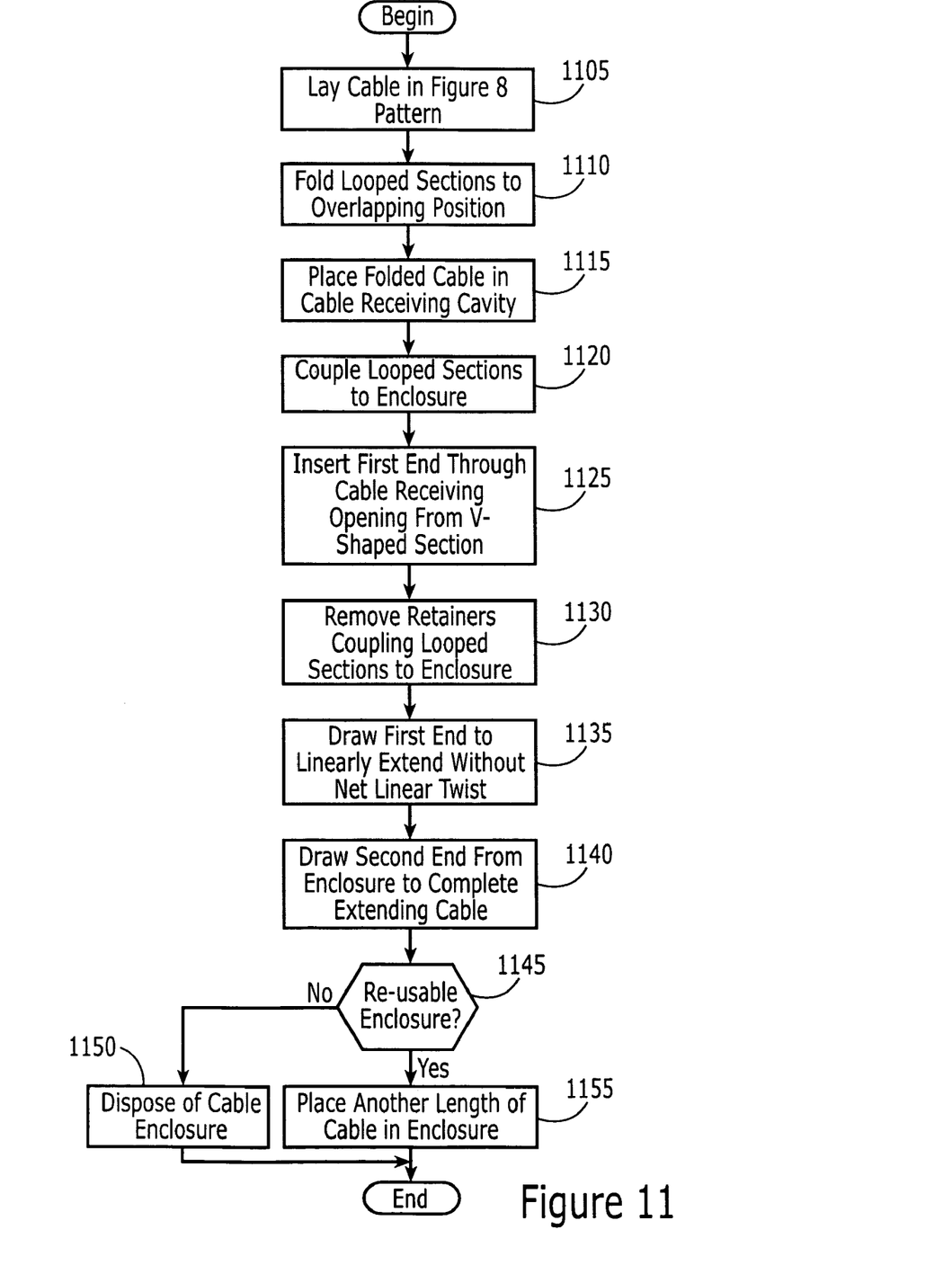
FIG. 11 is a flowchart illustrating operations for coiling a length of springy cable according to other embodiments of the present invention.

As shown for the embodiments of FIG. 10, operations begin with placing the folded length of cable in a cable receiving cavity of an enclosure with the cable receiving opening proximate to the V-shaped region defined by the folded over cable arrangement (block 1000). Placing the folded length of cable in the cable receiving cavity at block 1000, may including positioning the looped sections in the cable receiving cavity overlapping each other rotated about the cross-over section in a first selected direction to facilitate tangle free drawing of first end of the cable from the enclosure. Furthermore, where the cable enclosure includes interior dividing walls, as described with reference to FIGS. 5 and 6 above, positioned in the cable receiving cavity, placing the folded length of cable in the cable receiving opening at block 1000 may further include placing the cable in the cavity with the interior dividing walls separating the first and second looped sections to limit entanglement of the cable when the end is drawn through the cable receiving opening.

A first end of the length of cable extending from the V-shaped region is inserted through the cable receiving opening of the cable enclosure. As shown in FIG. 10, in some embodiments of the present invention, an opposite second end of the cable that does not extend through the cable receiving opening may be coupled to the cable enclosure using a retainer (block 1020).

The embodiments illustrated in FIG. 10 further show operations for reversing the arrangement of the cable in the enclosure to allow drawing out of the cable into a linearly extended position using the second end. As shown at block 1030, the length of cable is removed from the cable receiving cavity, for example, by opening the end flaps 532, 532' shown in FIGS. 5 and 6. The looped sections are rotated about the cross-over section in a substantially opposite second direction (block 1040). In other words, with reference to FIG. 3, the looped sections 112, 114 can be reversed from the rotational orientation in direction D1 about the cross-over section 116 to the dotted line orientation shown rotated in a direction D2 about the cross-over section 116. The rotated looped sections are placed in the cable receiving cavity with the second end extending through the cable receiving opening to facilitate tangle-free drawing of the second end of the cable from the enclosure (block 1050). In some embodiments, the first end may then be coupled to the enclosure using a retainer such as a tie-wrap (block 1060).

Further embodiments of methods of coiling a length of springy fiber optic cable will now be described with reference to the flowchart illustration of FIG. 11. As shown in the embodiments of FIG. 11, operations begin with laying the length of cable having a first end and a second end in a FIG. 8 pattern including an intermediate cross-over region between respective first and second looped sections of the cable (block 1105). The first looped section is folded in a selected direction about the cross-over section into a position overlapping the second looped section, with the first and second looped sections extending from the cross-over section at an acute angle relative to each other to define a V-shaped region (block 1110). The folded length of cable is placed in a cable receiving cavity of a cable enclosure with a cable receiving opening proximate to the V-shaped region and with the looped sections positioned in the cable receiving cavity rotated about the cross-over section in the selected direction (block 1115).

In some embodiments of the present invention, for purposes of shipment or the like, operations further include coupling the looped sections of the cable to the enclosure using removable retainers to maintain the V-shaped region substantially free of cable (block 1120). The first end of the length of the cable extending from the V-shaped region is inserted through the cable receiving opening of the cable enclosure (block 1125). The selected rotation direction is selected to facilitate tangle-free drawing of the first end of the cable from the cable enclosure through the cable receiving opening.

To dispense cable, the removable retainers retaining the looped sections coupled to the enclosure are removed (block 1130). The first end of the cable extending through the cable receiving opening is drawn from the enclosure to linearly extend the length of cable without causing an accumulated net linear twist of the length of cable (block 1135). For example, the drawing of the cable may occur in a field location during installation of a fiber optic network or the like. Removal of the cable from the enclosure may be completed by drawing the second end of the cable from the enclosure through the cable receiving opening (block 1140).

It is then determined whether the cable enclosure is a reusable enclosure (block 1145). If the enclosure is not intended for reuse (block 1145), such as with a cardboard dispensing enclosure that also provides shipping and transportation packaging for an individual length of cable, the cable enclosure is disposed of (block 1150). If the enclosure is to be reused (block 1145), another length of cable is placed in the cable receiving cavity (block 1155). As with the first length of cable, the new length of cable placed in the enclosure may have a first end extending through the cable receiving opening and a second end in the cable receiving cavity, which second end may be coupled to the enclosure to limit the risk that it will cause tangling of the cable during drawing to linearly extend the cable.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A cable product, comprising:
   a cable enclosure defining a cable receiving cavity and having a cable receiving opening extending to the cable receiving cavity; and
   a length of springy cable in the cable receiving cavity and having an arrangement with a first and a second looped section with an intermediate cross-over section between the first and second looped sections of the cable, wherein the first and second looped sections are positioned overlapping each other and extending from the cross-over section at an acute angle relative to each other to define a V-shaped region and wherein either a first end or an opposite second end of the cable extends through the cable receiving opening from the V-shaped region to enable withdrawal of either the first end or the opposite second end of the cable from the arrangement through the cable receiving opening to linearly extend the length of cable with no more than a single twist of the cable to limit accumulated net linear twist of the cable while linearly extending the cable,
   wherein the first and second looped sections are removably positioned in the cable receiving cavity overlapping each other rotated about the cross-over section in a first direction with the first end extending through the cable receiving opening to facilitate tangle free drawing of the first end of the cable from the arrangement or rotated about the cross-over section in a substantially opposite second direction with the second end extending through the cable receiving opening to facilitate tangle free drawing of the second end of the cable from the arrangement.

2. The cable product of claim 1, wherein the acute angle is selected based on a stiffness of the cable.

3. The cable product of claim 1, wherein the acute angle is about 10 degrees.

4. The cable product of claim 1, further comprising interior dividing walls positioned in the cable receiving cavity that separate the first and second looped sections to limit entanglement of the cable when the end is drawn from the cable arrangement.

5. The cable product of claim 4, wherein the interior dividing walls are V-shaped.

6. The cable product of claim 1, further comprising removable retainers coupling the looped sections of the cable to the enclosure that maintain the v-shaped region substantially free of cable when the cable product is moved, wherein the removable retainers are removed to allow the end of the cable to be drawn from the cable arrangement.

7. The cable product of claim 1, wherein the cable enclosure and the interior dividing walls are cardboard.

8. The cable product of claim 1, wherein the length of cable is removably positioned in the cable receiving cavity to allow the looped sections to be rotated about the cross-over section between the first and the second direction and re-inserted in the cable receiving section.

9. The cable product of claim 1, further comprising an optical device on the first and/or second end of the cable.

10. The cable product of claim 1, further comprising a retainer coupling the second end of the cable to the cable enclosure.

11. The cable product of claim 1, wherein the overlapping looped sections define a cylindrical arrangement having an outer diameter of no more than about thirty-four inches and wherein the enclosure has a length and a width no less than the outer diameter of the cylindrical arrangement.

12. The cable product of claim 11, wherein the outer diameter of the cylindrical arrangement is about thirty-two inches and wherein the length and width of the enclosure are about thirty-four inches.

13. The cable product of claim 12, wherein the enclosure has a depth of about twelve inches and wherein the length of cable is about one thousand feet.

14. The cable product of claim 1, wherein the first and second looped sections are positioned in the cavity in a non-overlapping relationship with each other and wherein the cable receiving opening is positioned proximate the cross-over section.

15. The cable product of claim 14, wherein the cable enclosure is cardboard.

16. The cable product of claim 14, wherein the end comprises a first end of the cable and further comprising an opposite second end of the cable and wherein the cable product further comprises an optical device on the first and/or second end of the cable.

17. The cable product of claim 1, wherein the springy cable comprises a fiber optic cable.

18. The cable product of claim 17, wherein the fiber optic cable comprises flat drop cable.

19. A cable arrangement comprising a length of springy cable having an arrangement with a first and a second looped section with an intermediate cross-over section between the first and second looped sections of the cable and wherein the first and second looped sections are positioned overlapping each other and extending from the cross-over section at an acute angle relative to each other to define a V-shaped region and wherein either a first end or an opposite second end of the cable extends from the V-shaped region to enable withdrawal of either the first end or the second end of the cable from the arrangement with no more than a single twist of the cable to limit accumulated net linear twist of the cable while linearly extending the cable, wherein the first and second looped sections overlap each other rotated about the cross-over section in a first direction with the first end extending from the V-shaped region to facilitate tangle free drawing of the first end of the cable from the arrangement or rotated about the cross-over section in a substantially opposite second direction with the second end extending from the V-shaped region to facilitate tangle free drawing of the second end of the cable from the arrangement.

20. The cable arrangement of claim 19, wherein the first and second looped sections are positioned overlapping each other to provide a substantially cylindrical shaped cable arrangement.

21. The cable arrangement of claim 20, further comprising a plurality of retainer members positioned around the cable at selected locations on the cable arrangement that retain the cable looped in the arrangement.

22. The cable arrangement of claim 21, wherein the plurality of retainer members includes a retainer member on each of the looped sections and a retainer member on the cross-over section.

23. The cable arrangement of claim 22, wherein the retainer members comprises tie-wraps.

24. The cable arrangement of claim 20, further comprising an optical device on the first end or the second end of the cable.

25. The cable arrangement of claim 19, wherein the springy cable comprises a fiber optic cable.

26. The cable arrangement of claim 25, wherein the fiber optic cable comprises flat drop cable.

27. A method of coiling a length of springy cable, the method comprising:
 laying the length of cable in a FIG. 8 pattern including an intermediate cross-over region between respective first and second looped sections of the cable, and
 securing the length of cable in the FIG. 8 pattern, including placing the length of cable in a cable receiving cavity of a cable enclosure, wherein the cable enclosure includes a cable receiving opening extending to the cable receiving cavity and wherein placing the length of cable is preceded by folding the first looped section into a position overlapping the second looped section with the first and second looped sections extending from the cross-over section at an acute angle relative to each other to define a V-shaped region and wherein placing the length of cable comprises:
 placing the folded length of cable in the cable receiving cavity with the cable receiving opening proximate the V-shaped region; and
 inserting an end of the length of cable extending from the V-shaped region through the cable receiving opening of the cable enclosure, and
 wherein the method further comprises:
 removing the length of cable from the cable receiving cavity;
 rotating the looped sections about the cross-over section in a substantially opposite second direction; and
 placing the rotated looped sections in the cable receiving cavity with the second end extending through the cable receiving opening to facilitate tangle free drawing of the second end of the cable from the arrangement.

28. The method of claim 27, wherein placing the folded length of cable in the cable receiving cavity further comprises coupling the second end of the cable to the enclosure using a retainer and wherein removing the length of cable from the cable receiving cavity includes separating the second end from the enclosure and wherein placing the rotated looped sections in the cable receiving cavity includes coupling the first end of the cable to the enclosure using a retainer.

29. The method of claim 27, wherein the cable enclosure includes interior dividing walls positioned in the cable receiving cavity and wherein placing the folded length of cable in the cable receiving cavity comprises placing the length of cable in the cable receiving cavity with the interior dividing walls separating the first and second looped sections to limit entanglement of the cable when the end is drawn through the cable receiving opening.

30. The method of claim 27, wherein placing the folded length of cable in the cable receiving cavity further comprises coupling the looped sections of the cable to the enclosure using removable retainers to maintain the V-shaped region substantially free of cable.

31. The method of claim 30, wherein securing the length of cable is followed by:
 removing the removable retainers; and
 drawing the first end of the cable from the FIG. 8 pattern to linearly extend the length of cable without causing more than a single twist of the cable to limit accumulated net linear twist of the cable while linearly extending the cable.

32. A method of coiling a length of springy cable, the method comprising:
 laying the length of cable in a FIG. 8 pattern including an intermediate cross-over region between respective first and second looped sections of the cable; and
 securing the length of cable in the FIG. 8 pattern, including placing the length of cable in a cable receiving cavity of a cable enclosure, wherein the cable enclosure includes a cable receiving opening extending to the cable receiving cavity and wherein placing the length of cable is preceded by folding the first looped section into a position overlapping the second looped section with the first and second looped sections extending from the cross-over section at an acute angle relative to each other to define a V-shaped region and wherein placing the length of cable comprises:
 placing the folded length of cable in the cable receiving cavity with the cable receiving opening proximate the V-shaped region; and
 inserting an end of the length of cable extending from the V-shaped region through the cable receiving opening of the cable enclosure;
 wherein placing the folded length of cable in the cable receiving cavity further comprises coupling the looped sections of the cable to the enclosure using removable retainers to maintain the V-shaped region substantially free of cable and wherein securing the length of cable is followed by:
 removing the removable retainers; and
 drawing the first end of the cable from the FIG. 8 pattern to linearly extend the length of cable without causing more than a single twist of the cable to limit accumulated net linear twist of the cable while linearly extending the cable, and wherein the cable enclosure is cardboard and wherein drawing the first end of the cable is followed by:
 drawing the second end of the cable from the enclosure; and then
 disposing of the cable enclosure.

33. The method of claim 30, wherein placing the folded length of cable in the cable receiving cavity further comprises coupling the second end of the cable to the enclosure using a retainer.

34. The method of claim 27, wherein the method further comprises attaching an optical device on the first and/or second end of the cable.

35. The method of claim 27, wherein the cable comprises a fiber optic cable.

36. The method of claim 35, wherein the fiber optic cable comprises flat drop cable.

37. The method of claim 36, wherein the overlapping looped sections define a cylindrical arrangement having an outer diameter of no more than about thirty-four inches and wherein the enclosure has a length and a width no less than the outer diameter of the cylindrical arrangement.

38. The method of claim 37, wherein the enclosure has a depth of about twelve inches and wherein the length of cable is about one thousand feet.

39. A method of coiling a length of springy cable, the method comprising:
  laying the length of cable in a FIG. 8 pattern including an intermediate cross-over region between respective first and second looped sections of the cable; and
  securing the length of cable in the FIG. 8 pattern, including placing the length of cable in a cable receiving cavity of a cable enclosure, wherein the cable enclosure includes a cable receiving opening extending to the cable receiving cavity and wherein placing the length of cable is preceded by folding the first looped section into a position overlapping the second looped section with the first and second looped sections extending from the cross-over section at an acute angle relative to each other to define a V-shaped region and wherein placing the length of cable comprises:
  placing the folded length of cable in the cable receiving cavity with the cable receiving opening proximate the V-shaped region; and
  inserting an end of the length of cable extending from the V-shaped region through the cable receiving opening of the cable enclosure;
  wherein placing the folded length of cable in the cable receiving cavity further comprises coupling the looped sections of the cable to the enclosure using removable retainers to maintain the V-shaped region substantially free of cable and wherein securing the length of cable is followed by:
  removing the removable retainers; and
  drawing the first end of the cable from the FIG. 8 pattern to linearly extend the length of cable without causing more than a single twist of the cable to limit accumulated net linear twist of the cable while linearly extending the cable, and
  wherein drawing the first end of the cable is followed by:
  drawing the second end of the cable from the enclosure; and then
  placing another length of cable in the cable receiving cavity, the another length of cable having a first end extending through the cable receiving opening and a second end in the cable receiving cavity.

40. A method of coiling a length of springy fiber optic cable, the method comprising:
  laying the length of cable having a first end and a second end in a FIG. 8 pattern including an intermediate cross-over region between respective first and second looped sections of the cable;
  folding the first looped section in a selected direction about the cross-over section into a position overlapping the second looped section with the first and second looped sections extending from the cross-over section at an acute angle relative to each other to define a V-shaped region;
  placing the folded length of cable in a cable receiving cavity of a cable enclosure with the cable receiving opening proximate the V-shaped region and with the looped sections positioned in the cable receiving cavity rotated about the cross-over section in the selected direction; and
  inserting the first end of the length of cable extending from the V-shaped region through the cable receiving opening of the cable enclosure, wherein the selected direction is selected to facilitate tangle free drawing of the first end of the cable from the cable enclosure,
  wherein the method further comprises:
  removing the length of cable from the cable receiving cavity;
  rotating the looped sections about the cross-over section in a substantially opposite second direction; and
  placing the rotated looped sections in the cable receiving cavity with the second end extending through the cable receiving opening to facilitate tangle free drawing of the second end of the cable from the cable enclosure.

41. The method of claim 40, wherein the fiber optic cable comprises flat drop cable.

42. The method of claim 40, wherein placing the folded length of cable in the cable receiving cavity further comprises coupling the second end of the cable to the enclosure using a retainer and wherein removing the length of cable from the cable receiving cavity includes separating the second end from the enclosure and wherein placing the rotated looped sections in the cable receiving cavity includes coupling the first end of the cable to the enclosure using a retainer.

43. The method of claim 40, wherein the cable enclosure includes interior dividing walls positioned in the cable receiving cavity and wherein placing the folded length of cable in the cable receiving cavity comprises placing the length of cable in the cable receiving cavity with the interior dividing walls separating the first and second looped sections to limit entanglement of the cable when the end is drawn through the cable receiving opening.

44. The method of claim 40, wherein placing the folded length of cable in the cable receiving cavity further comprises coupling the looped sections of the cable to the enclosure using removable retainers to maintain the V-shaped region substantially free of cable.

45. A cable arrangement comprising a length of springy cable looped in a FIG. 8 arrangement with an intermediate cross-over section between respective first and second looped sections of the cable, wherein the FIG. 8 arrangement enables withdrawal of either a first end or an opposite second end of the cable from the arrangement to linearly extend the length of cable with no more than a single twist of the cable to limit accumulated net linear twist of the cable while linearly extending the cable, wherein the first end is withdrawn from the cross-over section in a first direction and the second end in withdrawn from the cross-over section is withdrawn from the cross-over section in a second direction, opposite from the first direction to facilitate tangle free drawing of the first end or the second end of the cable from the arrangement.

46. A cable product comprising a cable enclosure defining a cable receiving cavity with the cable arrangement of claim 45 positioned in the cable receiving cavity.

* * * * *